(12) United States Patent  (10) Patent No.: US 7,365,280 B2
Nishikawa et al.  (45) Date of Patent: Apr. 29, 2008

(54) SWITCH AND MANUFACTURING METHOD THEREOF

(75) Inventors: Hisashi Nishikawa, Ika-gun (JP);
 Hiroyuki Kosaka, Tsuruga (JP);
 Yoshiyuki Nakade, Tsuruga (JP);
 Takao Matsui, Obama (JP); Tetsuya Koma, Tsuruga (JP); Makoto Nagahara, Hirakata (JP); Hiroyuki Takeshita, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 32 days.

(21) Appl. No.: 11/252,569

(22) Filed: Oct. 19, 2005

(65) Prior Publication Data

US 2006/0084292 A1 Apr. 20, 2006

(30) Foreign Application Priority Data

Oct. 20, 2004 (JP) .............................. 2004-305472

(51) Int. Cl.
 *H01H 1/06* (2006.01)
(52) U.S. Cl. ...................................... 200/279; 439/884
(58) Field of Classification Search ................ 200/279, 200/242; 29/622, 874; 439/884
 See application file for complete search history.

(56) References Cited

U.S. PATENT DOCUMENTS

| D133,641 | S | * | 9/1942 | High ........................... D13/173 |
| 2,490,020 | A | * | 12/1949 | Enzler .......................... 200/279 |
| 2,854,074 | A | * | 9/1958 | Frank et al. ................... 29/566 |
| 3,148,098 | A | * | 9/1964 | Beste, Jr. ....................... 216/13 |
| 3,344,316 | A | * | 9/1967 | Stelmak ....................... 361/773 |
| 3,346,350 | A | * | 10/1967 | Spooner ...................... 428/600 |
| 3,663,920 | A | * | 5/1972 | Lapham et al. ................ 439/72 |
| 3,714,384 | A | * | 1/1973 | Burkhardt .................. 200/51 R |
| 3,881,799 | A | * | 5/1975 | Elliott et al. ................. 439/816 |
| 4,074,112 | A | * | 2/1978 | Runft .......................... 200/279 |
| 4,420,203 | A | * | 12/1983 | Aug et al. ..................... 439/71 |
| 4,453,795 | A | * | 6/1984 | Moulin ....................... 439/361 |
| 4,466,184 | A | * | 8/1984 | Cuneo et al. .................. 29/830 |
| 4,892,487 | A | * | 1/1990 | Dranchak et al. ............ 439/260 |
| 4,937,653 | A | * | 6/1990 | Blonder et al. .............. 257/739 |
| 5,020,217 | A | * | 6/1991 | Gonzalez et al. .............. 29/882 |
| 5,118,299 | A | * | 6/1992 | Burns et al. ................... 439/74 |
| 5,190,463 | A | * | 3/1993 | Datta et al. .................... 439/74 |
| 5,207,585 | A | * | 5/1993 | Byrnes et al. ................. 439/66 |
| 5,326,428 | A | * | 7/1994 | Farnworth et al. ........... 324/724 |
| 5,430,614 | A | * | 7/1995 | Difrancesco ................ 361/785 |
| 5,499,924 | A | * | 3/1996 | Arisaka et al. ................ 439/67 |

(Continued)

FOREIGN PATENT DOCUMENTS

| CN | 1151600 A | 6/1997 |
| JP | S63-186020 | 11/1988 |
| JP | 06-309979 | 11/1994 |
| JP | 2001-297654 | 10/2001 |

*Primary Examiner*—Neil Abrams
(74) *Attorney, Agent, or Firm*—Steptoe & Johnson LLP

(57) ABSTRACT

A switch provided with a fixed contact and a movable contact coming into contact with each other and separating from each other. The surface of at least one of the fixed contact and the movable contact is provided with a plurality of recesses whose edges are overlapped with each other, and also provided with a plurality of projections. The projections formed on the contact surface have sharp-pointed tips which can break an oxide film or the like if it is formed on the contact surface, thereby achieving stable contact.

10 Claims, 7 Drawing Sheets

U.S. PATENT DOCUMENTS 6,275,052 B1 * 8/2001 Hembree et al. ............ 324/754
6,305,991 B1 * 10/2001 Gerster ....................... 439/801
6,672,879 B2 * 1/2004 Neidich et al. ................ 439/67
2005/0042892 A1 * 2/2005 An et al. ....................... 439/65

* cited by examiner

SWITCH AND MANUFACTURING METHOD THEREOF

BACKGROUND OF THE INVENTION

1. Field of the Invention

The present invention relates to a switch used, for example, to control the lighting of a lamp. It more specifically relates to a switch for vehicles used, for example, to control the lighting of a stop lamp when a car brake pedal is operated, and to a method for manufacturing the switch.

2. Background Art

In recent years, push switches for vehicles have been used more and more to control the lighting of a stop lamp in response to the operation of a brake pedal. A push switch for vehicles turns on the stop lamp when the brake pedal is pressed, and turns off when the driver's foot leaves the brake pedal.

One conventional switch for vehicles, which is disclosed in Japanese Patent Unexamined Publication No. 2001-297654, will be described as follows with reference to FIGS. 7 and 8.

As shown in FIG. 7, the conventional push switch for vehicles is provided with box-like case 1 which is made of insulating resin and whose top surface has an opening, and operating body 2 made of insulating resin. Case 1 is provided with a plurality of downwardly projecting fixed contacts 3 in the vicinity of the opening, and with terminals 3A extending downward from bottom surface 1A of case 1.

Between movable contacts 4 made of a conductive metal and the bottom surface of case 1 is held push spring 5 in a slightly compressed condition. Push spring 5 pushes movable contacts 4 upward to bring movable contacts 4 into contact with fixed contacts 3. Fixed contacts 3 are electrically connected with each other via movable contacts 4 so as to form switch contacts.

The conventional push switch for vehicles is further provided with coiled return spring 6, and cover 7 for covering the opening of the top surface of case 1. Return spring 6 is held in a slightly compressed condition between the bottom surface of operating body 2 and bottom surface 1A of case 1, thereby energizing operating body 2 upward.

Cover 7 has hollow cylindrical part 7A which extends upward and which accommodates operating shaft 2A of operating body 2 in such a manner as to be vertically movable. The top end of operating shaft 2A extends beyond hollow cylindrical part 7A.

The push switch for vehicles thus structured is generally installed in front of a car brake pedal in such a manner that operating shaft 2A of operating body 2 is pressed by an arm or the like. Terminals 3A of fixed contacts 3 are connected to the stop lamp via a connector or the like.

When the brake pedal is not pressed, operating shaft 2A of operating body 2 is pushed downward. More specifically, push spring 5 and return spring 6 are compressed, so that movable contacts 4 are lowered to be away from fixed contacts 3, and that fixed contacts 3 are electrically disconnected from each other. As a result, the stop lamp is turned off.

In this condition, when the brake pedal is pressed, the arm is separated from operating shaft 2A to remove the pressing force applied on operating shaft 2A. Consequently, the elastic restoring force of return spring 6 moves operating body 2 upward, and movable contacts 4 are pushed up by push spring 5 so as to come into resilient contact with fixed contacts 3. As a result, fixed contacts 3 are electrically connected with each other, thereby turning on the stop lamp.

As such stop lamps whose lighting is controlled by a switch for vehicle, electric lamps, LEDs (Light Emitting Diodes) and the like are generally used. In the case of using an electric lamp, a comparatively large current of about 10 A is applied at 12Vdc, whereas in the case of using an LED, as small as about 0.5 A to 1 A is applied at 12Vdc.

As shown in the partial cross sectional view shown in FIG. 8, in the case where the surface of each movable contact 4 and the surface of each fixed contact 3 are smooth and are in contact with each other at a single point and where an LED or the like requiring a small current is used as the stop lamp, an oxide film or the like forms on the surfaces of fixed contacts 3 and/or on the surfaces of movable contacts 4, thereby making the contact unstable.

To overcome this inconvenience, Japanese Utility Model Unexamined Publication No.S63-186020 discloses a contact device in which the surface of at least one of fixed contact 11 and movable contact 12 is designed to have a surface roughness of 0.5 to 10 μm. The aim of this is to stabilize the contact by roughening the surface so as to create a plurality of contact points. However, the disclosed method for surface roughening, that is, press working by using a press jig having the predetermined surface roughness can only provide the contact surface or surfaces with projections whose tips are smooth or flat. This has little effect on breaking an oxide film or the like formed on the contact surface or surfaces, thereby making it difficult to stabilize the contact with a small electric current.

Furthermore, when the surface roughness of the contact surface or surfaces is 0.5 to 10 μm, if an insulating oxide enters from outside the switch or develops due to the repeated opening and closing of the contacts, the entered insulating oxide or developed oxide with the size of 10 μm or larger can be projected from the contact surface or surfaces so as to cause the contacts to come into contact with each other via the projected insulating oxide, thereby making it difficult to achieve stable contact.

SUMMARY OF THE INVENTION

An embodiment of the present invention provides a switch provided with a first contact and a second contact which come into contact with each other and separate from each other, and at least one of the first and second contacts is provided on a surface thereof with a plurality of recesses whose edges are overlapped with each other. Thus overlapping the edges of the recesses with each other provides the contact surface with a plurality of recesses having sharp-pointed tips. This can secure the stability of electrical connection.

An embodiment of the present invention provides a method for manufacturing a switch, and the method includes pressing a punch, which is provided with a plurality of protruding portions, against the surface of the first contact or the second contact a plurality of times so as to form a plurality of projections on the contact surface. This facilitates the manufacture of a switch having stable contact.

DETAILED DESCRIPTION OF THE INVENTION

Figure 3:
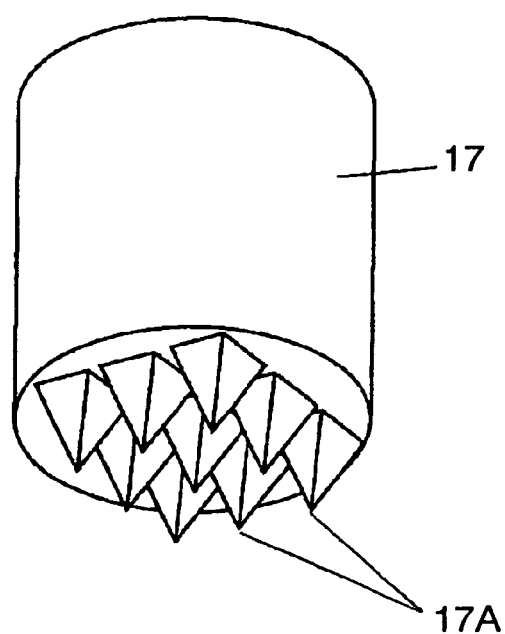
FIG. 3 is a perspective view of a punch according to the embodiment of the present invention.

As a measure to solve the problem in that the production of an oxide film or the like on the surface of a fixed contact or a movable contact makes the contact between these contacts unstable, punch 17 shown in FIG. 3 is pressed against movable contact 4 just one time so as to provide the surface of movable contact 4 with a plurality of recesses 4A and a plurality of projections 4B. This approach allows the surface of movable contact 4 made of a silver-copper alloy to have the asperities shown in FIG. 6. Here, it is checked whether projections 4B formed by this approach can break an oxide film or the like developed on the contact surface so as to bring the surface of movable contact 4 and the surface of fixed contact 3 into contact with each other at a plurality of points, thereby achieving stable contact even in the case of using a small electric current. The term, "stable contact" means a condition where an electric contact is secured. The term "small electric current" indicates a current of about 0.5 A to 1 A at 12 Vdc used for the lighting of an LED or the like.

Figure 6:
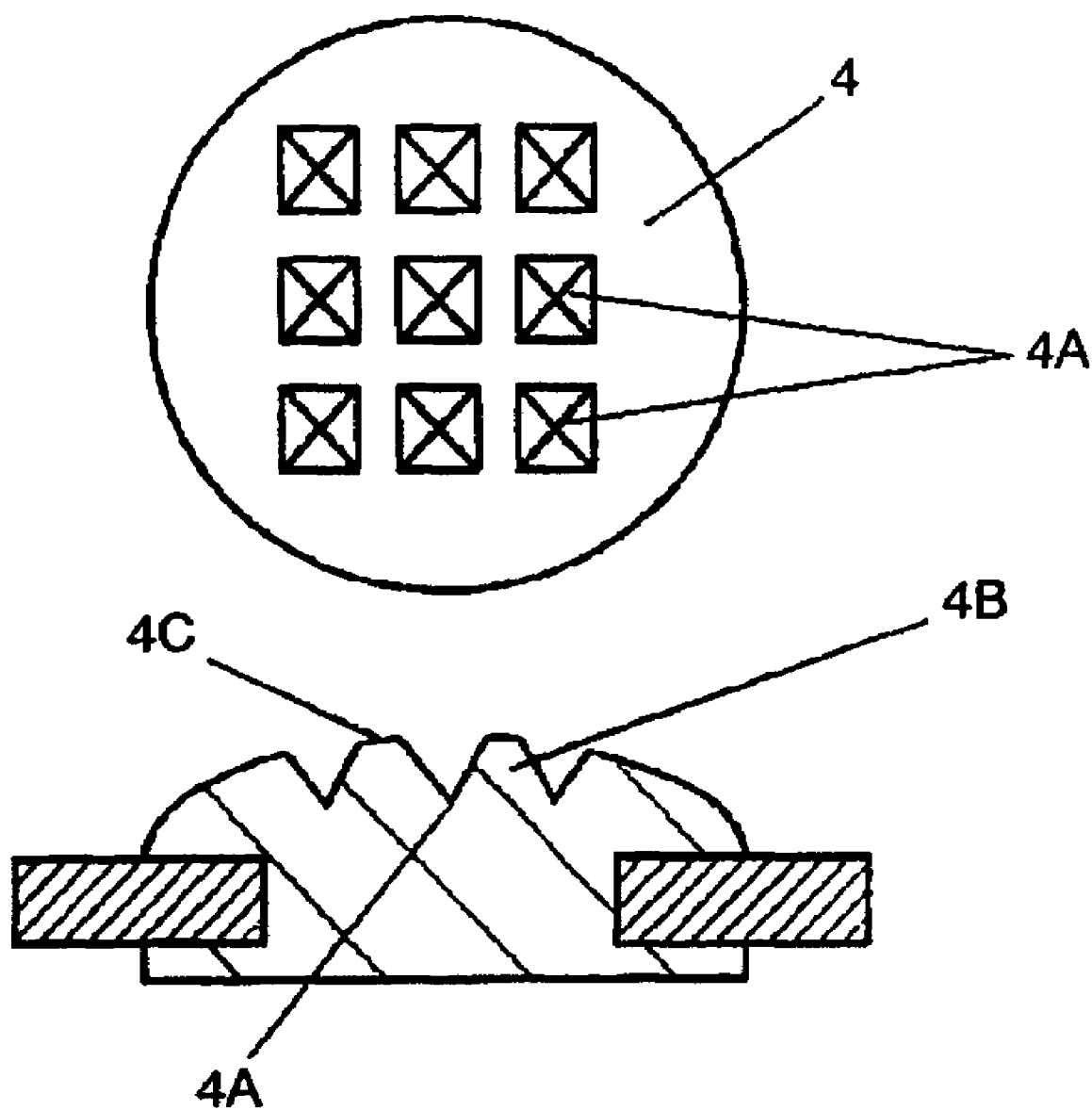
FIG. 6 is a partial plan view and a cross sectional view of a switch for vehicles according to a comparative example.
Figure 7:
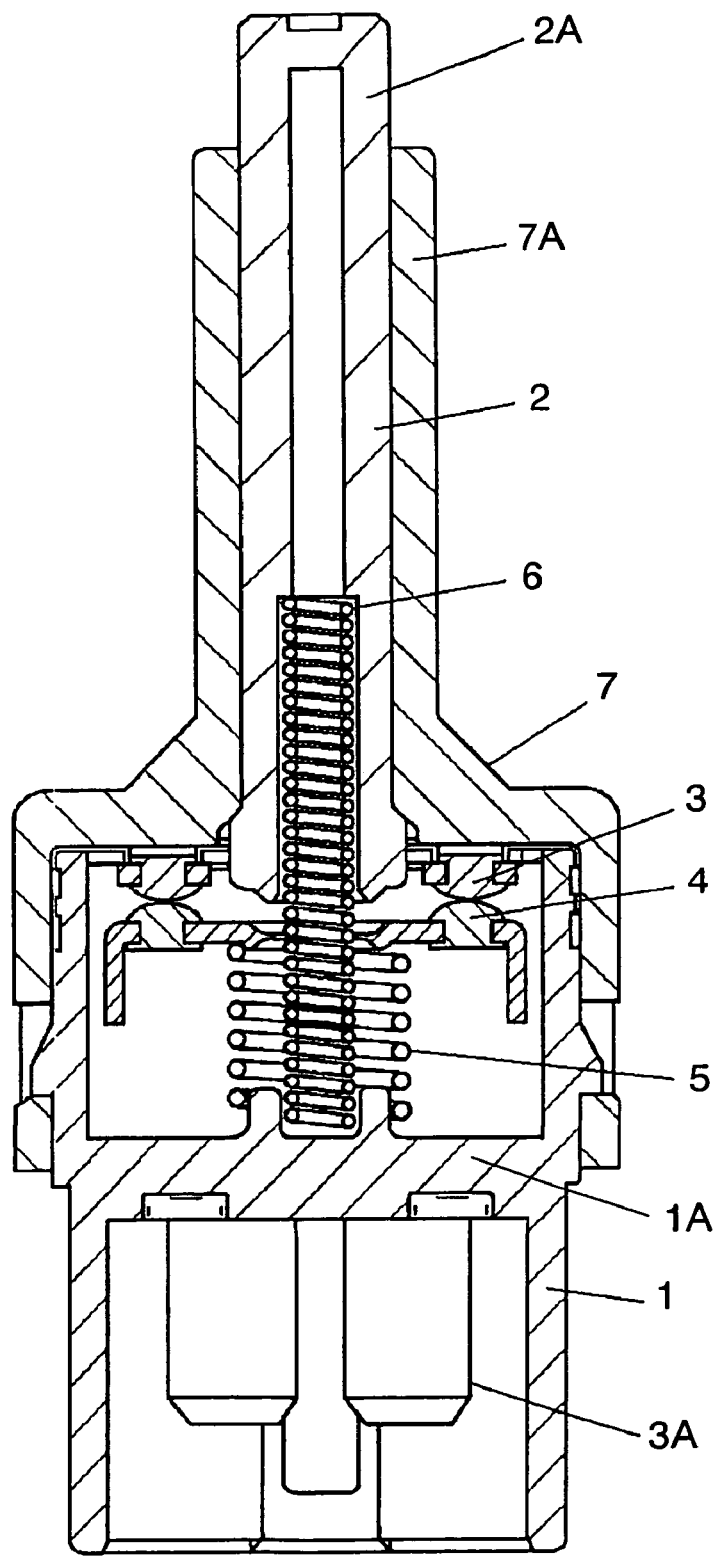
FIG. 7 is a cross sectional view of a conventional switch for vehicles.
Figure 8:
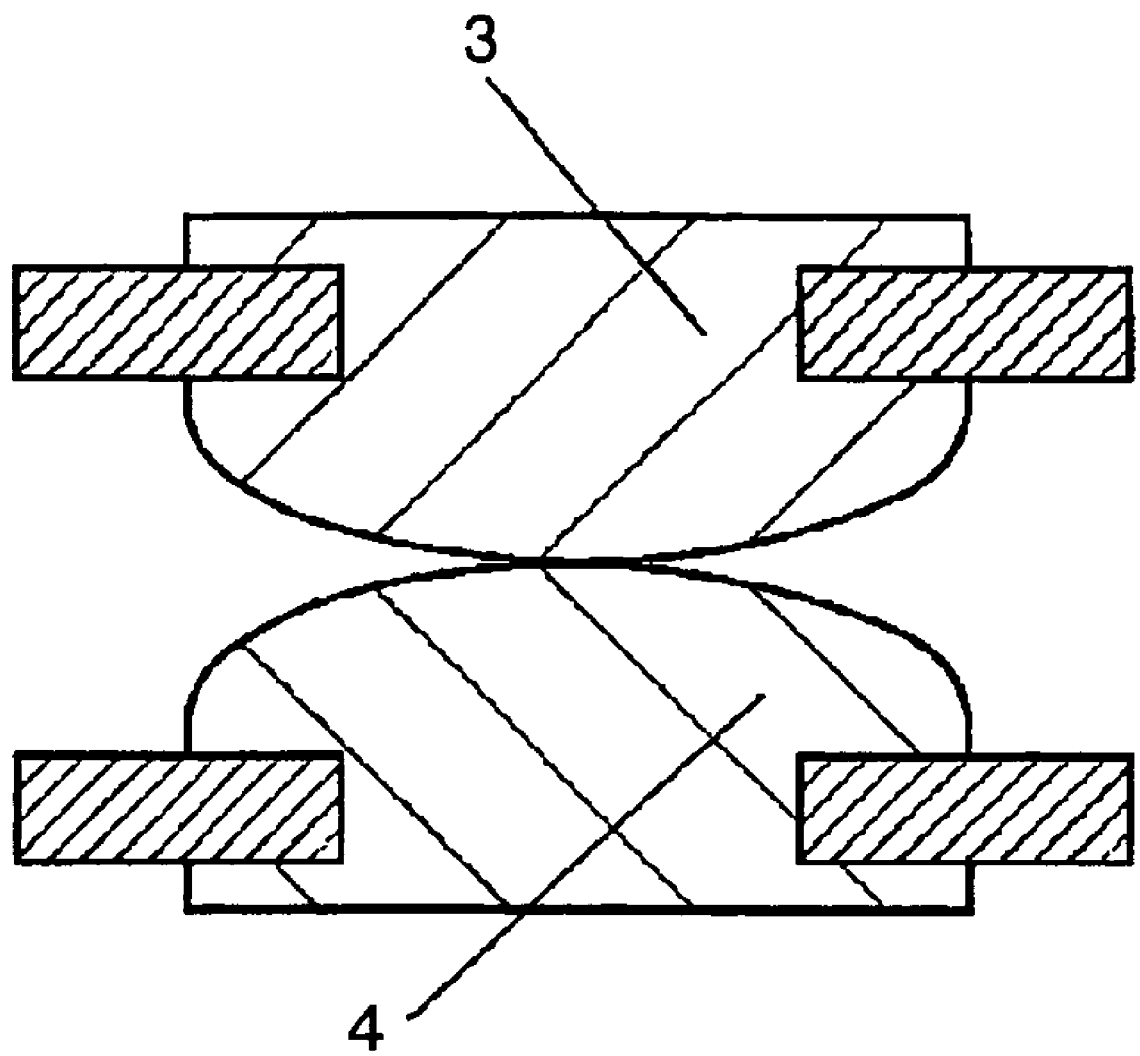
FIG. 8 is a partial cross sectional view of the conventional switch for vehicles.

In the aforementioned method, it is possible to form recesses 4A and projections 4B on the contact surface, but it is difficult to sharpen the tips of projections 4B. Consequently, the contact surface still has flat regions 4C as shown in FIG. 6, thereby having little effect on breaking the oxide film or the like developed on the contact surface. The stability of the electrical connection of the switch shown in FIG. 6 in the case of contact opening and contact closing at a current of about 0.5 A to 1 A at 12Vdc is checked as follows. Switches provided with contacts having the shape shown in FIG. 6 are tested to check the contact opening and contact closing with a current of 0.5 A at 12Vdc. After the contacts are switched a predetermined number of times under an atmosphere where oxidation may be promoted, some switches increase their connection resistance. This result indicates that the contact shape shown in FIG. 6 is not sufficient to stabilize the contact with a small current.

After much consideration about shapes suitable for the contact surface and about effective methods for obtaining contact surface having a preferable shape, the concept of the present invention has been obtained.

In the switch of the present invention, a plurality of recesses whose edges are at least partly overlapped with each other are formed on the surface of at least one of a movable contact formed inside the case and a fixed contact coming into contact with or separating from the movable contact. The movable contact is explained as a second contact and the fixed contact is explained as a first contact in an embodiment. The formation of the plurality of recesses whose edges are overlapped with each other can provide the surface with a plurality of projections having sharp-pointed tips. Consequently, even when the surface has an insulating film such as an oxide film thereon, the projections having sharp-pointed tips break the film, thereby providing stable contact.

The plurality of recesses in the switch of the present invention may be different in size. Providing recesses different in size allows the projections on the contact surface to be finer in size and to have sharper-pointed tips.

The method for manufacturing the switch of the present invention includes pressing a punch, which is provided with a plurality of protruding portions, against the surface of the movable contact or the fixed contact a plurality of times so as to form a plurality of recesses on the surface. This facilitates the manufacture of a switch having stable contact.

In the method for manufacturing the switch of the present invention, the protruding portions of the punch may be shaped like quadrangular pyramids. This allows the projections formed on the contact surface to have sharp-pointed tips, and also makes it possible to produce a punch by cutting or grinding in a simpler manner than other punches having complicated shaped protruding portions.

The projections formed on a surface of the first contact and/or the second contact according to the method of an embodiment of the present invention may include projections whose tips have an acute angle in cross section.

Embodiments of the present invention will be described as follows with reference to FIGS. 1 to 5.

Note that the components the same as those described in Background Art above will be labeled with the same reference marks, and the description will be simplified.

In the following embodiments, the present invention will be described by taking up a switch for vehicles as an example.

Figure 1:
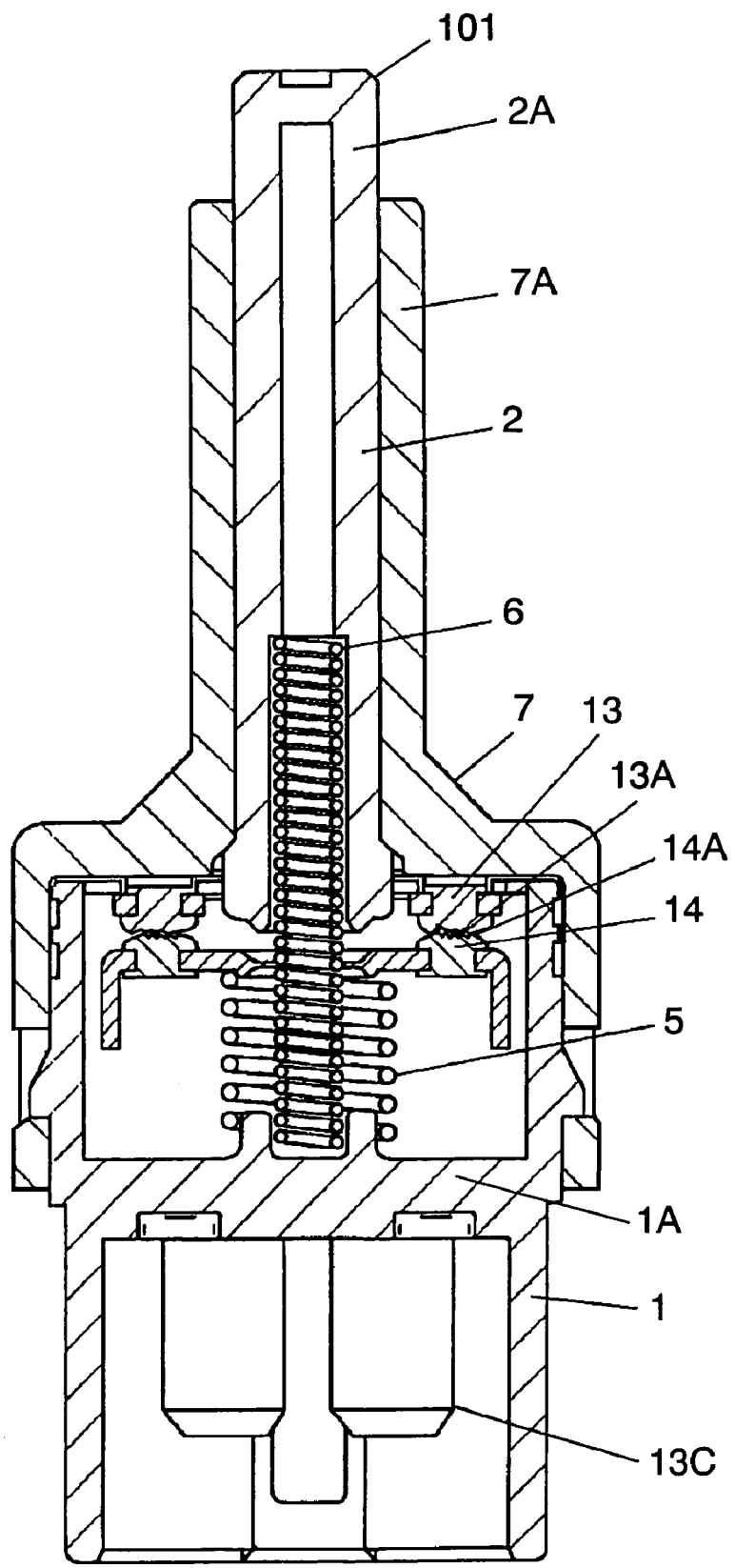
FIG. 1 is a cross sectional view of a switch for vehicles according to an embodiment of the present invention.

FIG. 1 is a cross sectional view of a switch for vehicles of an embodiment of the present invention. Switch-for-vehicles 101 of the present embodiment is provided with box-like case 1 which is made of insulating resin and whose top surface has an opening, and approximately cylindrical operating body 2 also made of insulating resin. Case 1 is provided with terminals 13C extending downward from bottom surface 1A, and with a plurality of fixed contacts 13 at the top thereof.

Switch-for-vehicles 101 is further provided with movable contacts 14 made of a conductive metal. Between movable contacts 14 and the bottom surface of case 1 is held push spring 5 in a slightly compressed condition so as to energize movable contacts 14 from below towards fixed contacts 13. Here, push spring 5 is explained as an elastic member. Fixed contacts 13 in contact with movable contacts 14 are electrically connected with each other via movable contacts 14, thereby forming switch contacts.

Both fixed contacts 13 and movable contacts 14 are made of a silver-copper alloy and shaped like domes. As shown in the partial cross sectional view of FIG. 2, the dome-shaped surfaces of fixed contacts 13 are provided with a plurality of recesses 13A and projections 13B having various heights of about 10 to 300 μm. Similarly, the dome-shaped surfaces of movable contacts 14 are provided with a plurality of recesses 14A and projections 14B having a height of more than 10 μm and not more than about 300 μm. Each fixed contact 13 and each movable contact 14 are in contact with each other at a large number of points on projections 13B and 14B having sharp-pointed tips.

When the height of projections 13B and 14B is 10 μm or less, the contact between fixed contacts 13 and movable contacts 14 with a small current cannot be fully stabilized. If an insulating oxide, which has entered from outside the switch or developed due to the repeated opening and closing of the contacts, is projected from the contact surface, then the contacts come into contact with each other via the projected insulating oxide. This makes it difficult to achieve stable contact.

On the other hand, when the height is larger than 300 µm, more flat regions are left or fewer projections are formed on the contact surface, so that the height is also inadequate for the stabilization of the contact.

In order to break the insulating film such as an oxide film formed on the contact surface so as to secure the contact between the contacts, thereby improving contact stability, the tips of projections 13A preferably have an acute angle in cross section.

Switch-for-vehicles 101 is further provided with coiled return spring 6 and cover 7 for covering the opening on the top surface of case 1. Return spring 6 is held in a slightly compressed condition between the bottom surface of operating body 2 and bottom surface 1A of case 1 so as to energize operating body 2 upward.

Cover 7 is provided with hollow cylindrical part 7A which extends upward and which accommodates operating shaft 2A of operating body 2 in such a manner as to be vertically movable. The top end of operating shaft 2A is projected beyond hollow cylindrical part 7A.

The following is a description mainly about a method for manufacturing fixed contacts 13 and movable contacts 14 of switch-for-vehicles 101 thus structured.

At a first step, fixed contacts 13 and movable contacts 14 are held on a predetermined holder with their contact surfaces up. Then, punch 17 having a plurality of protruding portions 17A on its bottom surface as shown in the perspective view of FIG. 3 is lowered and pressed against the contact surface. When the pressing is stopped and punch 17 is removed, a plurality of recesses 14A are formed on, for example, slightly upper left of the surface of each of movable contacts 14 as shown in the partial plan view and cross sectional view of FIG. 4A.

Punch 17 can be comparatively easily formed by cutting, grinding or the like by shaping protruding portions 17A on the bottom surface of punch 17 as quadrangular pyramids with a height of about 350 µm and a tip angle of about 60 degrees, and by arranging them in a grid pattern at intervals of about 200 µm in X-directions and Y-direction.

Figure 4A:
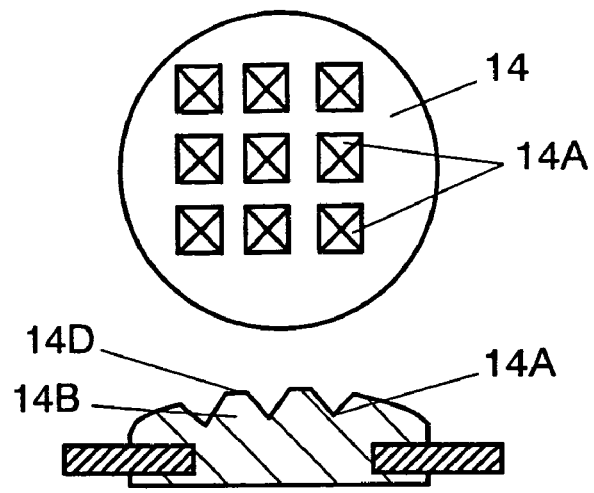
FIGS. 4A, 4B and 4C are partial plan views and cross sectional views of the switch for vehicles according to the embodiment of the present invention.

When punch 17 is pressed one time against the contact surface at a predetermined first position, a plurality of projections 14B are formed in such a manner that their tips are at intervals of about 200 µm in a grid pattern on slightly upper left of the surface of movable contact 14 as shown in FIG. 4A. It is difficult to sharpen the tips of the flat regions in the grid pattern, so that projections 14B still have some flat regions 14D at their tips.

Figure 4B:
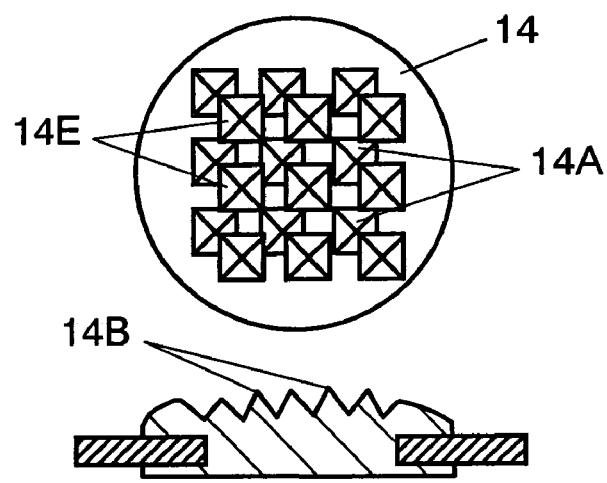

As a next process, punch 17 is shifted about 100 µm in the lower right direction as shown in FIG. 4B, and is pressed against the contact surface in a second position. This second pressing allows a plurality of recesses 14E to be formed slightly lower right in such a manner that their edges are overlapped with the edges of recesses 14A formed earlier. As a result, the surface of movable contact 14 has a plurality of projections 14B with sharp-pointed tips.

In this process, if punch 17 is shifted not less than 200 µm, which is the interval between protruding portions 17A, the second pressing causes some of projections 14B to be left with flat regions 14D at their tips, failing to make all of projections 14B have sharp-pointed tips.

In other words, projections 14B having sharp-pointed tips can be formed by pressing punch 17 having protruding portions 17A against the surface of movable contact 14 one time in the first position; then shifting punch 17 within the interval of protruding portions 17A; and pressing punch 17 against the surface in the second position so as to form recesses 14E whose edges are overlapped with the edges of recesses 14A.

Figure 4C:
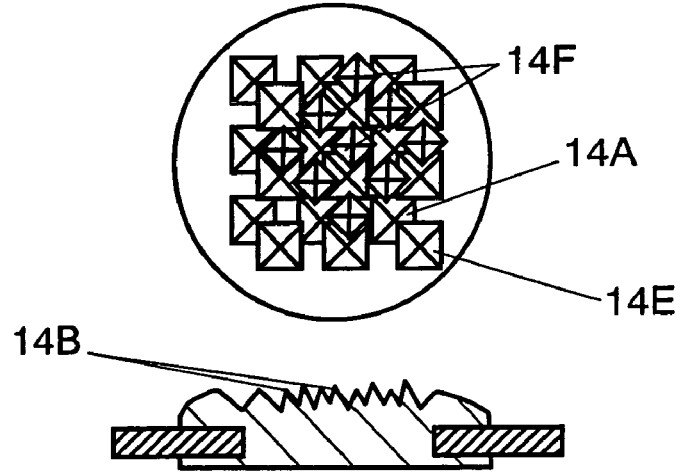

Later, as shown in FIG. 4C, it is possible to use a punch having protruding portions that are smaller than protruding portions 17A to form a plurality of recesses 14F different in size and position and 45 degrees rotated from recesses 14A and 14E at a third position, thereby providing projections 14B which are finer in size and provided with sharper-pointed tips in various heights. Alternatively, the shape of the recesses can be controlled by changing the pressing force of punch 17 instead of using a punch having protruding portions different in height from protruding portions 17A.

The switch for vehicles of the present embodiment provided with fixed contacts 13 and movable contacts 14 thus processed is generally installed in front of a car brake pedal in such a manner that operating shaft 2A of operating body 2 is pressed by an arm or the like. Terminals 13C of fixed contacts 13 are connected to the stop lamp via a connector or the like.

More specifically, when the brake pedal is not pressed, operating shaft 2A of operating body 2 is pushed downward, so that push spring 5 and return spring 6 are compressed, and that movable contacts 14 are lowered to be away from fixed contacts 13. Consequently, fixed contacts 13 are electrically disconnected from each other, so that the stop lamp is turned off.

In this condition, when the brake pedal is pressed, the arm is separated from operating shaft 2A to remove the pressing force applied on operating shaft 2A. Consequently, the elastic restoring force of return spring 6 moves operating body 2 upward to make push spring 5 push movable contacts 14 up, thereby bringing movable contacts 14 into resilient contact with fixed contacts 13. As a result, as shown in FIG. 1, fixed contacts 13 are electrically connected with each other, thereby turning on the stop lamp.

Figure 2:
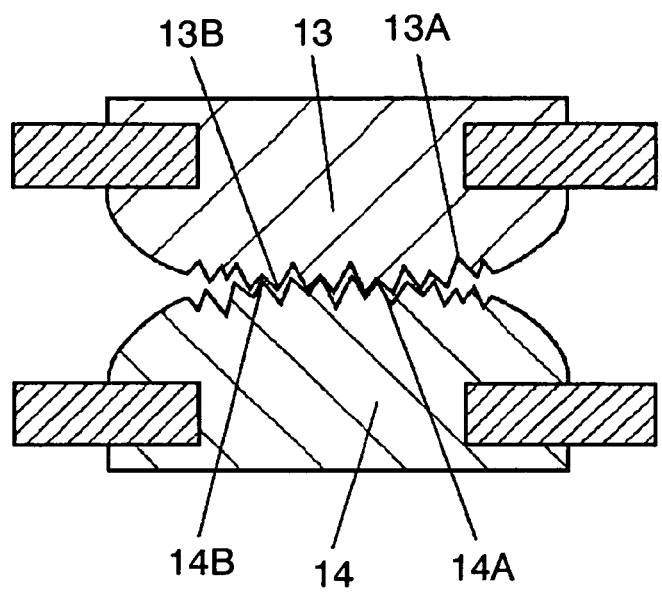
FIG. 2 is a partial cross sectional view of the switch for vehicles according to the embodiment of the present invention.

At this moment, as shown in FIG. 2, the surface of each fixed contact 13 is provided with recesses 13A whose edges are overlapped with each other and the surface of each movable contact 14 is provided with recesses 14A whose edges are overlapped with each other, so that each fixed contact 13 and each movable contact 14 come into contact with each other at a large number of points on projections 13B and 14B having sharp-pointed tips. This increases the contact pressure per point to make it possible to break an oxide film when it is formed on the contact surfaces, thereby achieving stable contact.

Every time the switch is operated to bring the contacts into contact with each other or to separate them from each other, projections 13B and 14B change their contact points, and projections 13B and recesses 13A brush against projections 14B and recesses 14A, respectively. This repeats the wiping of the contact surfaces, thus allowing the contact to be always done between clean surfaces.

Thus, according to the manufacturing method of the present embodiment, punch 17 having protruding portions 17A is pressed a plurality of times against the surfaces of at least one of fixed contacts 13 and movable contacts 14, which come into contact with and separate from each other in accordance with the vertical movement of operating body 2, so as to form recesses 13A whose edges are overlapped at least partly with each other and/or recesses 14A whose edges are overlapped at least partly with each other on the surfaces. This allows the contact surfaces to be provided with projections 13B and/or 14B having sharp-pointed tips. As a result, even if an oxide film forms, an insulating film adheres or an insulating oxide or the like accumulates onto the contact surfaces, projections 13B and/or 14B having sharp-pointed tips break them without fail, thereby providing a switch for vehicles having stable contact between the contacts, and also providing a method for manufacturing the switch.

Unlike the approach of roughening a surface by electric discharge machining or the like, the manufacturing method of the present embodiment allows projections 13B and 14B to be formed on the edges of recesses 13A and 14A to have sharp-pointed tips, which could not be achieved by a single transfer. The manufacturing method can also form a contact surface in a required shape. Furthermore, the position and number of projections 13B can be controlled freely.

Making recesses 14A, 14E and 14F different in size from each other can make projections 13B and 14B on the contact surfaces finer in size and sharper.

Shaping protruding portions 17A of punch 17 as quadrangular pyramids can provide the contact surface with projections 13B and 14B having sharp-pointed tips, and can also form a punch by cutting, grinding or the like in a simpler manner than other punches having complicated shaped protruding portions.

FIG. 4B shows a case where a single type of punch 17 is pressed against the contact surface one time in a first position, and to press against the contact surface one more time in a second position so as to form a plurality of recesses 14A and 14E. On the other hand, FIG. 4C shows a case where in addition to punch 17, another punch different in the shape and interval of protruding portions 17A is used in a second position so as to form recesses 14F different in size and interval from recesses 14A and 14E. The use of the method shown in FIG. 4C allows projections 14B to be finer in size and to have sharper-pointed tips.

It is also possible to use a punch provided with ridges and furrows having a sawtooth cross section, instead of punch 17 provided with quadrangular pyramid-shaped protruding portions 17A. As a first step, as shown in the partial plan view and cross sectional view of FIG. 5A, recesses 14G and projections 14H having a sawtooth cross section are formed on the surface of movable contact 14 in a first position by using the punch provided with the ridges and furrows having the sawtooth cross section. At a next step, the punch is rotated a predetermined degree and a pressing is done in a second position so as to form a plurality of projections having sharp-pointed tips. When necessary, additional pressings may be performed in a third, fourth or more positions.

Figure 5A:
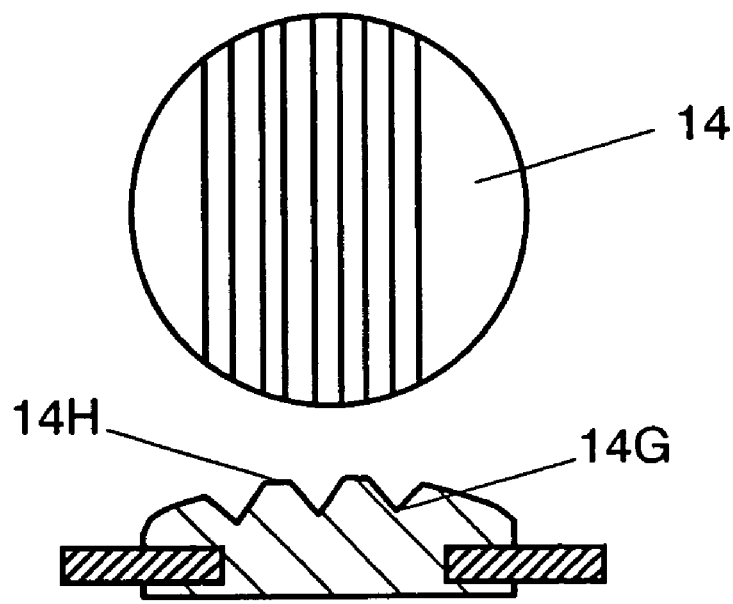
FIGS. 5A and 5B are partial plan views and cross sectional views of a punch according to another embodiment of the present invention.
Figure 5B:
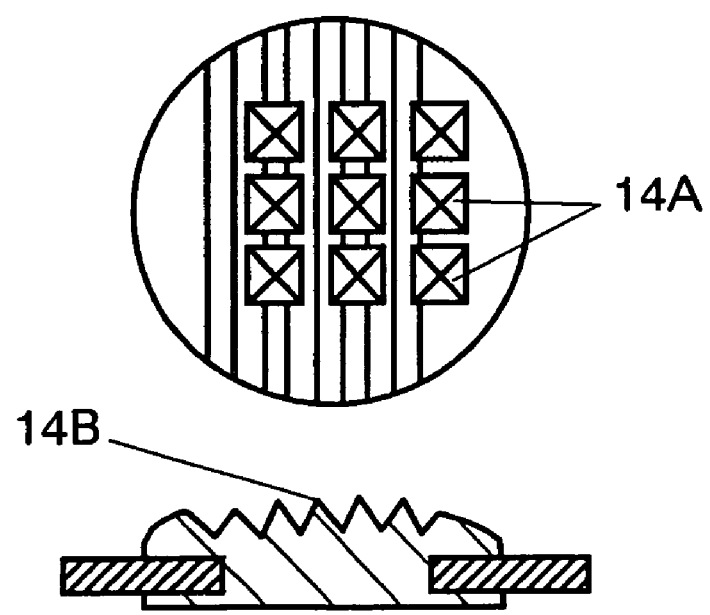

Alternatively, as shown in FIG. 5B, projections 14B having sharp-pointed tips in various heights can be produced by forming a plurality of recesses 14G and projections 14H having a sawtooth cross section in a first position by using a first punch provided with ridges and furrows having the sawtooth cross section and then forming recesses 14A in a second position by using a second punch having quadrangular pyramid protruding portions 17A.

Thus, a combination of various shaped protruding portions and the shift and rotation of a punch enables the formation of various recesses whose edges are overlapped with each other, thereby forming projections having sharp-pointed tips in various heights on the contact surfaces.

Contrary to the above description, it is possible to secure a punch, and to press fixed contacts 13 and movable contacts 14 against the secured punch a plurality of times.

The pressing and forming a plurality of recesses can be done on a contact put alone or on a contact secured to terminals or the like. The recesses can be processed at the same time as caulking the contacts to the terminals to reduce the number of steps and working hours.

In the present invention, fixed contacts 13 and movable contacts 14 can be made of silver tin oxide or silver cadmium oxide, besides a silver-copper alloy. However, a silver-copper alloy having 60 to 80 wt % of silver, 20 to 40 wt % of copper, several wt % of nickel, magnesium, tin oxide, indium oxide or the like is more suitable than the aforementioned hard and weak contact materials for the combination and separation with a DC voltage and is also suitable for the formation of recesses because of its flexibility.

The aforementioned description describes a press switch for vehicles which is mainly used to control a stop lamp in which movable contacts 14 come into contact with or separate from fixed contacts 13 in accordance with the vertical movement of operating body 2. The concept of the present invention, however, is also applicable to other types of switches such as a switch where the contacts come into contact with or separate from each other by using a leaf spring or the like, a switch for detecting door opening, and a seesaw switch for vehicles for opening a door window.

What is claimed is:

1. A switch comprising:
   a first contact,
   a second contact facing the first contact, and
   an elastic member for pressing the second contact against the first contact,
   wherein at least one of the first contact and the second contact is provided, on a surface thereof, with recesses having a predetermined shape, the recesses being overlapped at least partly with adjacent ones at edges thereof.

2. The switch of claim 1, wherein the recesses are shaped like quadrangular pyramids.

3. The switch of claim 2, wherein the recesses are shaped like quadrangular pyramids different in size.

4. The switch of claim 1, wherein at least one of the first contact and the second contact is made of a silver-copper alloy and is provided with the recesses on a surface thereof.

5. The switch of claim 1, wherein the recesses overlapped with adjacent ones at edges thereof form projections in various heights whose tips have an acute angle in cross section.

6. The switch of claim 1, wherein the switch is a switch for vehicles and the recesses formed in a contacting area of the first contact with the second contact have depths of not less than 10 μm nor more than 300 μm.

7. A method for manufacturing a switch comprising a first contact, a second contact facing the first contact and a mechanism for pressing the second contact against the first contact, the method comprising:
   pressing a plurality of punches having protruding portions different in shape from each other against a surface of at least one of the first contact and the second contact, thereby forming a plurality of recesses different in shape on the surface.

8. A method for manufacturing a switch comprising a first contact, a second contact facing the first contact and a mechanism for pressing the second contact against the first contact, the method comprising:
   a first pressing operation of pressing a first punch provided with a plurality of protruding portions against a surface of at least one of the first contact and the second contact in a first position, and a second pressing operation of pressing the first punch against the surface in a second position different from the first position.

9. A method for manufacturing a switch comprising a first contact, a second contact facing the first contact and a mechanism for pressing the second contact against the first contact, the method comprising:
- a first pressing operation of pressing a punch provided with a plurality of protruding portions shaped like quadrangular pyramids against a surface of at least one of the first contact and the second contact in a first position, and
- a second pressing operation of pressing the punch against the surface in a second position different from the first position.

10. A method for manufacturing a switch comprising a first contact, a second contact facing the first contact and a mechanism for pressing the second contact against the first contact, the method comprising:
- a first pressing operation of pressing a first punch provided with a plurality of first protruding portions against a surface of at least one of the first contact and the second contact in a first position, and
- a second pressing operation of pressing a second punch provided with a plurality of second protruding portions shaped different from the first protruding portions against the surface in a second position different from the first position.

* * * * *